Feb. 28, 1939.  E. REANEY  2,149,229

TRIANGLE CUTTER LOCK

Filed Aug. 6, 1937

INVENTOR
Ernest Reaney
BY
Albert F. Nathan
ATTORNEY

Patented Feb. 28, 1939

2,149,229

UNITED STATES PATENT OFFICE 2,149,229

TRIANGLE CUTTER LOCK

Ernest Reaney, Stratford, Conn., assignor to The O. K. Tool Company, Inc., New York, N. Y., a corporation of New York Application August 6, 1937, Serial No. 157,663

5 Claims. (Cl. 29—105)

This invention relates to improvements in blade holding means for inserted blade cutters and more particularly to blade and wedge inserts by means of which an adjustment of the cutting edges of the blade simultaneously in two directions may be effected without resort to the use of shims, serrations or auxiliary blade adjusting devices.

Among the objectives of the invention, a primary aim is to effect adjustments of the blade with respect to the cutter body in two directions in amounts proportional to the rates of wear on the respective cutting edges of the blade, and thereafter, to effect a firm and rigid clamping of the blade in its socket after such an adjustment and which clamping action is made more firm by the reacting forces of the tooling operation.

Still another objective of the invention is to affect a solid clamping of the blade by means of a wedge piece fitted in the body of a cutter in a manner whereby the body portion protects the clamping piece against erosion and multilation by the action of the chips.

Still another aim of the invention is to construct a blade clamp for an insertable blade utilizing a minimum of easily machinable parts and which may be readily adapted to a multi-bladed cutter without sacrificing a loss in strength of the cutter body itself. By way of additional refinement the invention further aims for a construction involving the wedge principle of clamp by which the blade is not only clamped against the side wall opposite the wedge, but also against the bottom wall of the blade slot, and in which the action of the tooling forces on the blade is such as to promote further clamping action against those surfaces.

In carrying out the objectives of the invention it is proposed to form a blade element tapered in two directions, that is, longitudinally and also transversely thereof, and to provide complementary shaped opening in the body member to receive the double tapered blade. The blade slot in the body member, in addition to being sloped rearwardly and laterally to provide the necessary rake and clearance angles for blade type cutters, the blade slot is also inclined inwardly, from front to rear, so that the outer and forward corner of the blade projects outwardly from the body or holder beyond any other point on the blade. After assembling the blade in the slot, the outer corner and end of the blade is ground square which, in a case of a given milling cutter will be respectively perpendicular and parallel with the cutter axis, and provided with the necessary relief.

To effect clamping of the blade, the wall of the blade slot, preferably at the front face of the blade is provided with a triangular recess tapered in the general direction of its length along an axis lying at an angle to the general longitudinal axis of the blade. Within the triangular recess, a triangular wedge piece is fitted, with the longest side of the triangular lying adjacent the front face of the blade. On assembling of the parts the blade is first positioned in the slot with its widest edge at the bottom of the slot and toward the outside, and then the triangular wedge is positioned in its recess against the front face of the blade and tapped firmly into clamping position.

As the axis of the wedge crosses the longitudinal axis of the blade at a relatively low angle, the inward movement of the wedge, in the direction of its axis, tends to move the transversely tapered blade substantially perpendicularly thereto and firmly against the bottom wall of the blade slot. As the blade is also tapered longitudinally and is positioned in the slot with its widest end outward, the pressure incident to the cutting action occurring at the outer and leading corner of the blade, also tends to move the blade inwardly and toward the bottom of the blade slot, thus promoting a more firm and secure clamping action.

The adjustments of the blade outwardly in two directions simultaneously is effected by backing out the triangular wedge and then repositioning the blade along the lower inclined wall of the blade slot. The angle of incline being transverse to both, the end and to the front cutting edges of the blade, is proportioned to advance the two cutting edges of the blades in amounts commensurate with the amounts the cutting edges require adjustment to compensate for regrinding operations. For example in a face milling cutter, if it is found that the blades do more work along their outer cutting edges (axial) than along their face cutting edges (radial), a low angle of incline is used so that as the blades are adjusted along the incline, the cutting edges are caused to project more at their ends than at their sides or forward faces so that the end cutting edge may be reground a number of times without materially extending the face cutting edge of the blade beyond the point required for a relatively fine dressing up operation. The steeper the angle of incline, the faster will be the rate of advance on the face as compared to the rate of advance on the diameter, and conversely.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:

Figure 1:
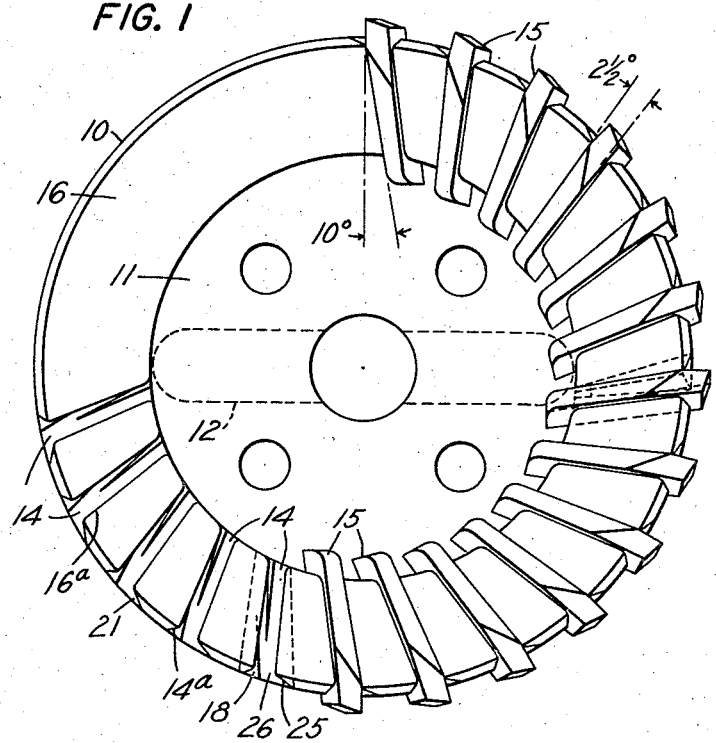
Figure 1 is a face view on a cone type milling cutter embodying this invention.
Figure 2:
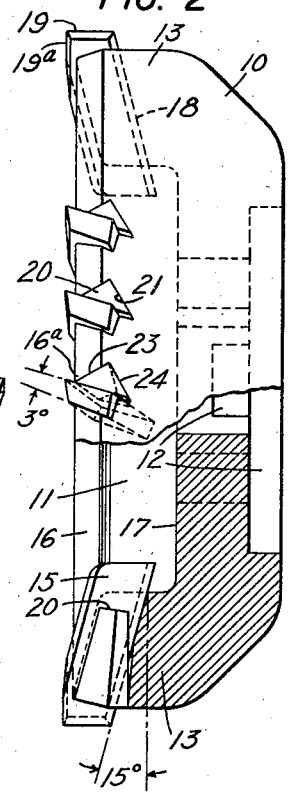
Fig. 2 is a side view thereof partly in section.

With reference to Figs. 1 and 2 of the drawing, a milling cutter illustrating a preferred embodiment of the invention is disclosed, which comprises a body member 10, amply recesses at its front or end face as at 11, to provide cutter runout space in milling the blade slots and chip clearance space when the cutter is in use. The rear face of the body is recessed and slotted as at 12 to fit the spindle or adapter plate of a standard machine. The recess at the front or end face of the body provides an upstanding annular portion 13 in which blade slots 14 are provided for receiving cutter blades 15. The end face 16 of the upstanding flange 13 is relieved inwardly forming a cone shaped outer end of the cutter body.

Figure 3:
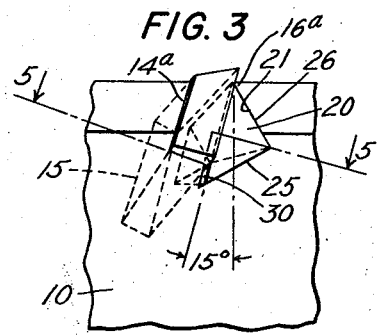
Figs. 3 and 4 are respective end and side views of the blade and blade clamp means enlarged to show certain details of its construction.

The blade slots 14 are milled inwardly from the concaved outer end of the body, in the general direction of the radius, and inclined, in the embodiment shown, at an angle of 15 degrees. The blade slots are also inclined from the radius approximately 10 degrees as illustrated in Fig. 1 and from a radial longitudinal plane (spirally) approximately 15 degrees as shown in Fig. 3 to provide the necessary rake angles at the front of each blade.

It will be observed from Fig. 2 that while the blade slots are inclined approximately 15 degrees from the plane of the outer face of the body, they do not extend into the bottom wall 17 of the recess and accordingly the cutter used in forming the slots may pass through the upstanding flange 13 without interfering with the bottom 17 of the body.

Each of the blade slots 14 and blades 15 are tapered in two directions, that is, each blade and slot is tapered approximately 2½ degrees longitudinally and 3° crosswise, both tapers preferably being formed upon the rear face of the blade and blade slot.

The respective tapers are so formed that the widest edge of the blade is toward the bottom of the inclined blade slot 18 and toward the outer cutting end 19, and so that the blade fits tightly between the side and bottom walls of the slot in its most inward position. The double taper, alone, will not, of itself, provide for adjustment of the blades, for as the blade is moved outwardly along the lower inclined wall of the slot the longitudinal taper frees the blade from the side walls of the slots.

Without using shims or ordinary wedge pieces for clamping the blades in position, it is possible by this invention to obtain a compound adjustment of the blades and a firm clamping thereof in adjusted position. This is effected by employing triangular wedge pieces 20 adjacent the front face of each of the blades 15. The front wall of each of the blade slots is provided with a triangular shaped recess 21, the general axis of which extends at an angle to the longitudinal axis of the related blade. To obtain clamping action, the triangular piece 20 is also tapered longitudinal approximately 7 degrees and is placed in the body so that the wide surface or face 22 thereof engages the front face of the blade. The two opposite sides 23 and 24 of the wedge engage complemental V surfaces 25 and 26 of the body.

Upon assembling, the wide portion of the triangular wedge is at the outer end 19 of the blade and body members, and as it is driven inwardly, the clamp face 22 thereof moves laterally into engagement with the front face of the blade and tends to carry the blade along with it. The carrying tendency of the wedge is prevented, however, by the smooth appositioned faces of the members and also by reason of the longitudinal taper provided on the rear of the blade which offers a semi-positive abutment resisting inward movement. By virtue of the relative angular relation between the axis of the perimidal wedge and the longitudinal axis of the blade and the crosswise taper on the blade, inward movement of the wedge exerts a transverse force on the blade whereby the latter is moved firmly against the bottom wall 18 of the slot. It will also be observed that the tooling forces acting on the end 19 and cutting edge 19ᵃ of the blade also tend to move the blade inward and toward bottom wall of the blade slots thereby promoting the clamping action instituted by the triangular wedge.

As the assembled cutter becomes dull during use, the cutting edges of the blades may be adjusted outwardly and from the end in amounts necessary to restore the cutter to its original size after a normal regrinding operation on the edges of 19 and 19ᵃ of the blades. The angles of incline given to the bottom walls 18 of the blade slots determines the relative rates of advance of the cutting edges of 19 and 19ᵃ for this purpose.

The re-adjustment is affected by releasing the triangular wedges by means of a drift pin placed at the rear end, and thereafter the blades are free to slide on the inclined walls 18. When advanced outward the required distance, the wedges are again driven in position to affect the clamping action as before. Upon re-adjustment, however, the triangular members will slide slightly further inward thereby compensating for the reduction in thickness of the blade as the latter is moved outward.

It will be further observed that there are no interlocking or interengaging means such as a rib and slot, or serrations, between the adjacent faces of the blade and wedge piece because, first, an interlock is not required by reason of the construction and relation of the tapers herein proposed and, secondly, an interlocking rib and groove connection would not only prevent a clamping of the blade against its rear and bottom walls but would defeat endwise adjustability thereof.

Figure 4:
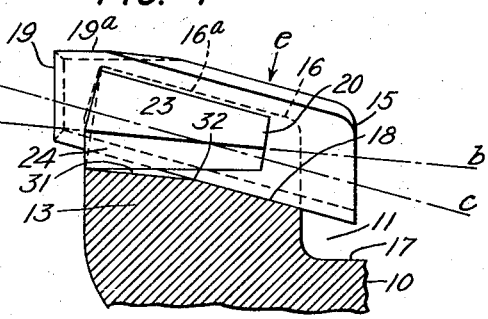

Referring to Fig. 4, it will be seen, that as the wedge is moving inwardly in the direction of its axis a, b, the blade member has a tendency to move in a direction of its axis c, d, and in doing so moves in the direction of the arrow e against the bottom wall 18 so that firm clamping of the blade is effected on three sides as distinguished from other constructions in which clamping is effected at only two sides.

In bringing about the clamp action, the wedge piece moves in a direction of its longitudinal axis in the V-shaped recess in the body and the side face 22 thereof, which overlaps the blade, moves laterally toward the adjacent face of the blade. It is the lateral movement of the face 22 that binds against the blade and forces the latter over against the rear retaining wall 14ª of the body. And since the overlapping face 22 moves laterally and simultaneously inwardly in the direction of clamping, a clearance aperture 30 extending into the bottom wall 18 of the blade slots, and a clearance space 31 extending under each wedge piece, must be provided. The former allows for the lateral movement of the face 22 without interference, while the latter allows for the inward movement. The clearance spaces 30 and 31 extend inwardly and intersect the plane of the bottom wall 18 at a point 32 midway between its ends. Beyond this point no provision for clearance is required as the face 22 of the wedge piece would then normally bear entirely against the adjacent face of the blade.

Figures 6, 7:
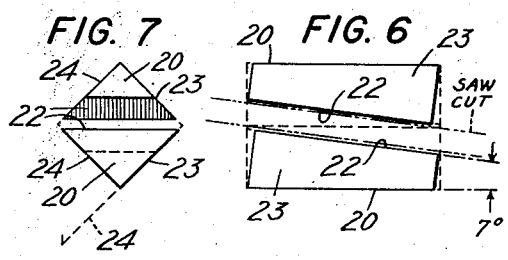
Figs. 6 and 7 are detail view of triangular wedge pieces and illustrate an improved method of their manufacture.
Figure 5:
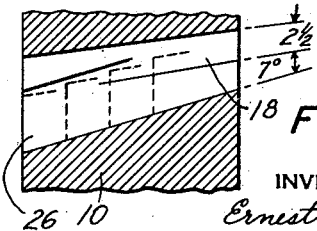
Fig. 5 is a plan view of the blade receiving recess taken along lines 5—5 of Fig. 3.

The present design of a triangular tapered wedge embodies the further advantage that the surfaces 22, 23, and 24, thereof are relatively large and thereby effect clamping over large areas. The surfaces 23 and 24, if extended into a single plane as represented by the dotted line in Fig. 7, embrace a much larger clamping area than is possible by a flat or a round tapered member having a clamping face of the size of the face 22.

While each blade is tapered longitudinally 2½ degrees, in the example illustrated and the wedge also tapered longitudinally 7 degrees, there is a relative angle of 4½ degrees between the members which is more than enough to affect the compensating action as well as the clamping action. Both angles, however, are low enough to be well within the angle of repose so that the members will not slide and release themselves of their own free will and accord.

The design of a triangular clamp element lends itself readily to efficient and inexpensive production from square stock of a size equal to the dimensions of one of the shorter sides 23, 24. By cutting the bar into short lengths and sawing each length on its diagonal in a generally longitudinal direction, two clamp members from each length of stock are formed. The lengthwise sawing of the bar is at the angle required for the longitudinal taper, in this case 7°, and if a saw is selected having a width such that one side thereof cuts on the hypotenuse of the square at the starting end of the cut, and the opposite side of the saw finishes on the hypotenuse of the square at the end of the cut, two triangular pieces having a lengthwise taper are formed with the one cut and which later require only slight dressing operation on their sawn faces 22 to make the finished clamp elements.

The V-shaped recesses which receive the wedge pieces are, as shown in the drawing, cut into the body member well below the end face 16 thereof, so that a substantial portion of the body member overhangs and substantially encloses the triangular wedges. The overhanging portion 16ª in addition to improving the clamping action, protects the triangular wedge and its socket from being worn away or badly disfigured by the action of the chips at the front of the blade. This type of construction effects a clamping of the blade against a solid back wall of the body while at the same time overcoming a serious difficulty encountered in the prior designs of face acting clamps.

The general design of milling cutter illustrated in Figs. 1 and 2, is particularly suitable to the herein disclosed type of clamp for the reason that neither the blade slot nor the recess for the wedge pieces extend axially of the body member any substantial distance and this means that the peripheral portions of the body may remain closed along its major length. Hence, the tendency for portions of the body to flex circumferentially as the wedges are successively driven in place, is precluded by the mass of the body remaining in one solid piece. In prior multi-bladed cutters, flexing of the body is inevitable and extreme care is necessary in driving-in wedges or tapered blades in order to prevent cracking and to place all portions of the body under equal stress and also so that the last blade or wedge, as the case may be, will project approximately the same amount as the first one. With the present design however, undue flexing is structurally prevented with the result that all blades and wedges may be driven home to approximately the same positions and in consequence a minimum amount of blade material is removed when the assembled cutter is again trued and ground to size.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of the United States:

1. An insertable blade cutter combining a body member having an open sided transversely tapered recess therein adapted to receive a blade and a locking piece; said recess comprising a blade receiving opening having mutually inclined side and bottom walls and a triangular shaped longitudinally tapered wedge receiving opening merging therewith with its longitudinal axis transverse the longitudinal axis of the blade opening; a blade member insertable in said recess, said blade having cutting edges at its outer end and being tapered in the general direction of its length and transversely thereto and adapted to be positioned in said recess with its widest longitudinal edge toward the bottom thereof, the general longitudinal axis of said recess being inclined relative to the general axis of the body member so that the cutting edges formed at the outer end of the blade advances in two directions simultaneously as the blade is shifted longitudinally in said recess; a lock piece insertable in said recess and normally engaging the adjacent face of said blade, said lock piece having three flat sides converging in the general direction of its length and being positioned in the recess with its longitudinal axis at an angle to the longitudinal axis of said blade and one flat side adapted to engage the blade whereby said blade member is clamped firmly against the rear and bottom walls of the recess in any longitudinally adjusted position when said lock piece is driven inward to effect clamping action.

2. An insertable blade cutting tool comprising a tapered blade member having plain smooth sides and a cooperating triangular locking member, said blade member being tapered in the direction of its length and also tapered in a direction transverse thereto, said locking member having three smooth sides converging in the general direction of its length and having one side thereof normally engaging the plain side of the blade with a general axis of said locking member at an angle to the longitudinal axis of said blade; a body member having a recess therein arranged for mounting said blade and locking members in the transverse relation defined and with the wide longitudinal edge of the blade toward the bottom, said recess having a bottom blade seating surface and a rear retaining wall mutually inclined complemental to the transverse taper on said blade, and a front wall having a V-shaped recess to receive said locking member, the general axis of said V-shaped recess being inclined relative to the longitudinal axis of said blade whereby said blade member is firmly clamped against said bottom wall and said rear retaining wall when said locking member is driven in position.

3. A blade clamp for insertable blade cutting tools comprising a rectangular blade member and a cooperating triangular shaped locking member, said blade member being tapered in the direction of its length and also tapered in a direction transverse thereto, said triangular member being likewise tapered in a direction of its length and having one side thereof normally adapted to engage the front face of the blade with a general axis of said triangular wedge member at an angle to the longitudinal axis of said blade, said two members forming a unit tapered in transverse directions; a body member having a recess therein for receiving said blade and wedge members, said recess having a bottom blade engaging wall and a rear retaining wall mutually inclined complemental to the transverse taper on said blade, and a front wall having a V-shaped recess therein longitudinally inclined toward said rear retaining wall complemental to the combined longitudinal taper of said wedge and blade members, the axis of said V-shaped recess also being inclined in the plane of the blade at an angle to its longitudinal axis whereby said blade member may be adjusted longitudinally in said recess to any preselected position and firmly clamped against said bottom wall and said rear retaining wall by driving in said triangular wedge.

4. An inserted blade cutting tool combining a body member having a longitudinally tapered recess provided therein adapted to receive a blade member and a blade clamping member; said recess comprising a blade receiving opening and a triangular shaped longitudinally tapered wedge receiving opening merging therewith with its longitudinal axis transverse the longitudinal axis of the blade opening; a blade member insertable in said recess; a triangular shaped clamping member insertable in the recess with one flat side thereof in engagement with said blade; said blade member being tapered in the direction of its width and said two members being tapered in the general direction of their length and arranged in said recess with their longitudinal axes divergent in a rearward direction whereby said blade is moved into clamped relation with the bottom and side walls of the recess in any longitudinally adjusted position as the lock piece is driven inward; said lock piece having a relatively large blade engaging surface adapted to normally overlap the lower marginal edge of the blade and extending below the bottom wall of the said recess; said blade recess having a clearance aperture in the bottom wall thereof for receiving the said overlapping portion of said clamp member as said member takes up new clamping positions laterally and inwardly incident to progressive outward adjustment of said blade.

5. An inserted blade cutting tool combining a body member having a tapered recess therein shaped in the form of a pair of facing openings and defined by a bottom wall, a mutually inclined flat side wall, and a V-shaped surface opposite said side wall, adapted to receive a blade member and a locking member; each of said pair of openings being of greater length than width and disposed in the body with the longitudinal axis of the V-shaped opening rearwardly diverging relative to the said bottom wall of the blade opening; a blade member insertable in said recess; said blade having a transverse taper and adapted to be inserted in the recess with its wider longitudinal edge toward the bottom; a triangular shaped locking member insertable in the V-shaped portion of the recess with one flat side thereof in engagement with said blade; said two members being tapered in the general direction of their length and arranged in said recess with their longitudinal axes divergent in a rearward direction whereby said blade is moved into clamped relation with the bottom and side walls of the recess in any longitudinally adjusted position in the recess as the lock-piece is driven inward; and means comprising a portion of the body member overlying said V-shaped opening, and thereby said lock piece, terminating in close proximity to the adjacent surface of the inserted blade for protecting said lock piece against erosion and mutilation by the cutting action of the chips.

ERNEST REANEY.